US011601299B2

(12) United States Patent
Sakurada et al.

(10) Patent No.: US 11,601,299 B2
(45) Date of Patent: Mar. 7, 2023

(54) INFORMATION PROCESSING APPARATUS, NON-TRANSITORY COMPUTER READABLE MEDIUM, AND INFORMATION PROCESSING METHOD

(71) Applicant: TOYOTA JIDOSHA KABUSHIKI KAISHA, Toyota (JP)

(72) Inventors: Shin Sakurada, Toyota (JP); Yasuhiro Baba, Gifu-ken (JP); Shuichi Sawada, Nagoya (JP); Shintaro Matsutani, Kariya (JP); Yurika Tanaka, Yokosuka (JP); Ryosuke Kobayashi, Nagakute (JP); Genshi Kuno, Kasugai (JP); Tomoya Makino, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/485,927

(22) Filed: Sep. 27, 2021

(65) Prior Publication Data
US 2022/0103396 A1  Mar. 31, 2022

(30) Foreign Application Priority Data
Sep. 29, 2020 (JP) .............................. JP2020-163864

(51) Int. Cl.
*H04L 12/28* (2006.01)
*F24F 11/30* (2018.01)
(Continued)

(52) U.S. Cl.
CPC .......... *H04L 12/2829* (2013.01); *F24F 11/30* (2018.01); *H04L 12/282* (2013.01);
(Continued)

(58) Field of Classification Search
CPC .............. H04L 12/2829; H04L 12/282; H04L 2012/285; F24F 11/30; F24F 11/52;
(Continued)

(56) References Cited

U.S. PATENT DOCUMENTS

2016/0140591 A1\* 5/2016 Wood ................. G06Q 30/0206
705/5
2020/0175534 A1\* 6/2020 Aggarwala ............. G01W 1/02

FOREIGN PATENT DOCUMENTS

JP   2000-003795 A   1/2000

\* cited by examiner

*Primary Examiner* — Charles R Kasenge
(74) *Attorney, Agent, or Firm* — Dinsmore & Shohl LLP

(57) ABSTRACT

An information processing apparatus includes a controller. The controller is configured to execute operations including: identifying a user; acquiring attribute information for the user, the attribute information being stored in association with the user; estimating, from the attribute information, a power consumption amount for an environment preferred by the user; determining whether the power consumption amount is equal to or greater than a predetermined value; upon determining that the power consumption amount is equal to or greater than the predetermined value, guiding the user to a first space; and upon determining that the power consumption amount is less than the predetermined value, guiding the user to a second space, wherein a power consumption amount for the first space is greater than a power consumption amount for the second space.

14 Claims, 7 Drawing Sheets

(51) Int. Cl.
*H05B 47/175* (2020.01)
*H05B 47/115* (2020.01)

(52) U.S. Cl.
CPC ......... *H05B 47/115* (2020.01); *H05B 47/175* (2020.01); *H04L 2012/285* (2013.01)

(58) Field of Classification Search
CPC ......... F24F 11/64; F24F 11/46; H05B 47/115; H05B 47/175; Y02B 20/40
See application file for complete search history.

FIG. 3

| USER ID | ATTRIBUTE INFORMATION |
|---|---|
| U01 | SENSITIVE TO HEAT |
| U02 | SENSITIVE TO COLD |
| U03 | PREFERS BRIGHT PLACES |
| U04 | PREFERS DARK PLACES |
| ⋮ | ⋮ |

FIG. 4

| ATTRIBUTE INFORMATION | POWER CONSUMPTION AMOUNT FOR ENVIRONMENT PREFERRED BY USER[kWh] |
|---|---|
| SENSITIVE TO HEAT | 3 |
| SENSITIVE TO COLD | 0.5 |
| ⋮ | ⋮ |

FIG. 5

| SPACE | POWER CONSUMPTION AMOUNT [kWh] |
|---|---|
| FIRST SPACE | 3 |
| SECOND SPACE | 1 |
| ⋮ | ⋮ |

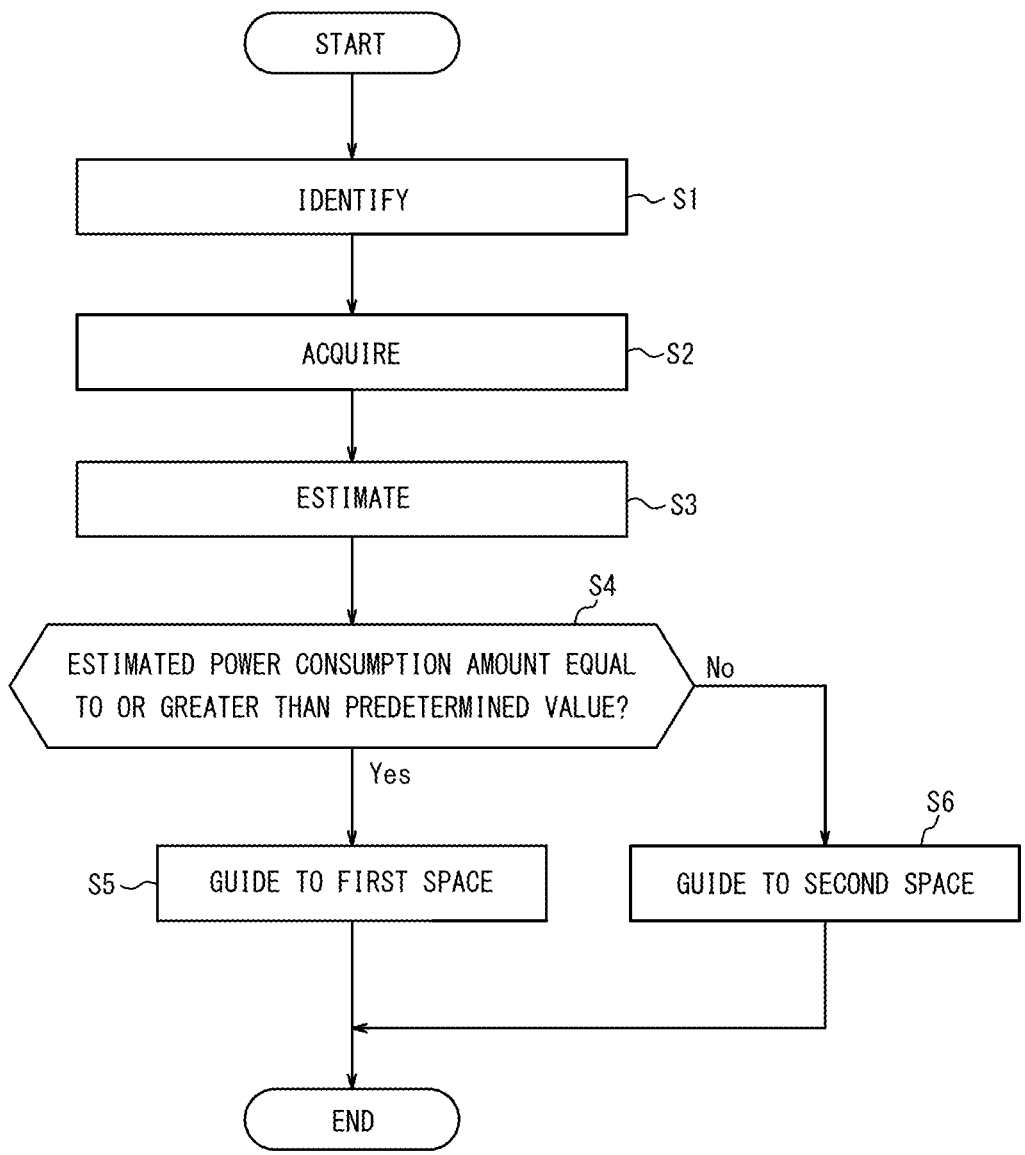

INFORMATION PROCESSING APPARATUS, NON-TRANSITORY COMPUTER READABLE MEDIUM, AND INFORMATION PROCESSING METHOD

CROSS-REFERENCE TO RELATED APPLICATION

This application claims priority to Japanese patent application No. 2020-163864 filed on Sep. 29, 2020, the entire disclosure of which is incorporated herein by reference.

TECHNICAL FIELD

The present disclosure relates to an information processing apparatus, a program, and an information processing method.

BACKGROUND

A technology for reading an attribute of a user (preference for temperature, lighting, etc.) from a badge held by the user in a room to automatically set an optimal room environment for the user is known (for example, Patent Literature [PTL] 1).

CITATION LIST

Patent Literature

PTL 1: JP 2000-003795 A

SUMMARY

When there are plurality of users in the same room, attributes may differ for each of the users. In this case, in PTL 1 mentioned above, it is not possible to set an optimal room environment for all users.

It would be helpful to provide an information processing apparatus, a program, and an information processing method capable of providing an environment that suits the preferences for each of the users.

An information processing apparatus according to an embodiment of the present disclosure includes a controller. The controller is configured to execute operations, the operations including:
identifying a user;
acquiring attribute information for the user, the attribute information being stored in association with the user;
estimating, from the attribute information, a power consumption amount for an environment preferred by the user;
determining whether the power consumption amount is equal to or greater than a predetermined value;
upon determining that the power consumption amount is equal to or greater than the predetermined value, guiding the user to a first space; and
upon determining that the power consumption amount is less than the predetermined value, guiding the user to a second space, wherein a power consumption amount for the first space is greater than a power consumption amount for the second space.

A program according to an embodiment of the present disclosure is configured to cause a computer, as an information processing apparatus, to execute operations, the operations including:
identifying a user;
acquiring attribute information for the user, the attribute information being stored in association with the user;
estimating, from the attribute information, a power consumption amount for an environment preferred by the user;
determining whether the power consumption amount is equal to or greater than a predetermined value;
upon determining that the power consumption amount is equal to or greater than the predetermined value, guiding the user to a first space; and
upon determining that the power consumption amount is less than the predetermined value, guiding the user to a second space,
wherein a power consumption amount for the first space is greater than a power consumption amount for the second space.

An information processing method according to an embodiment of the present disclosure is performed by an information processing apparatus, the information processing method including:
identifying a user;
acquiring attribute information for the user, the attribute information being stored in association with the user;
estimating, from the attribute information, a power consumption amount for an environment preferred by the user;
determining whether the power consumption amount is equal to or greater than a predetermined value;
upon determining that the power consumption amount is equal to or greater than the predetermined value, guiding the user to a first space; and
upon determining that the power consumption amount is less than the predetermined value, guiding the user to a second space,
wherein a power consumption amount for the first space is greater than a power consumption amount for the second space.

The information processing apparatus, the program, and the information processing method according to embodiments of the present disclosure can provide an environment that suits the preference for each of the users.

BRIEF DESCRIPTION OF THE DRAWINGS

In the accompanying drawings:
FIG. 3 is a diagram illustrating a data structure for a user DB (database);
FIG. 4 is a diagram illustrating a data structure for attribute information DB;
FIG. 5 is a diagram illustrating a data structure for a space DB;
FIG. 7 is a flowchart illustrating operation of the information processing apparatus.

DETAILED DESCRIPTION

Figure 1:
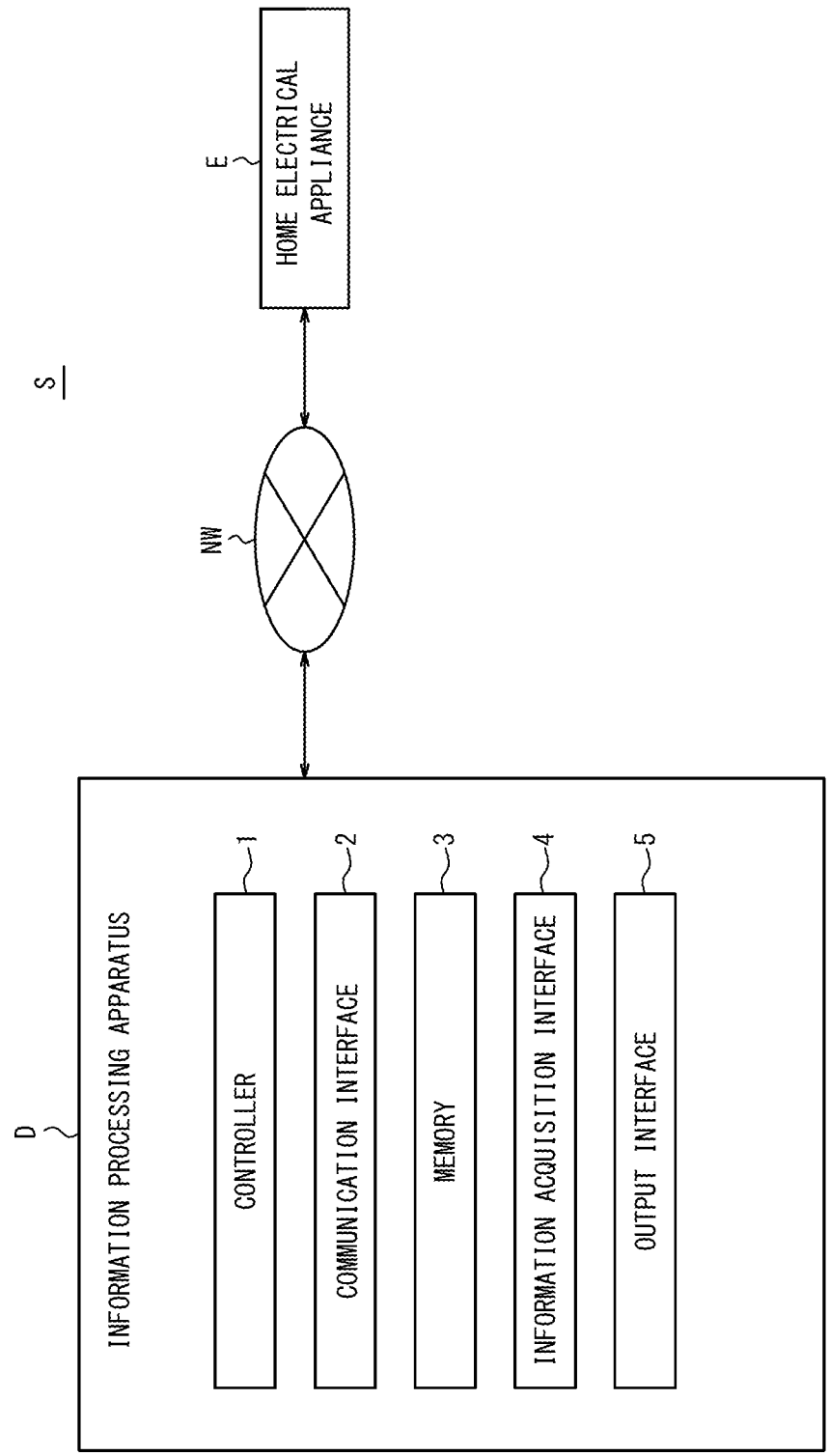
FIG. 1 is a schematic diagram of an information processing system including a block diagram illustrating a configuration of an information processing apparatus.

FIG. 1 is a schematic diagram of an information processing system S according to an embodiment. The information processing system S includes an information processing apparatus D and a home electrical appliance E, which are communicably connected to each other via a network NW. The network NW includes, for example, the Internet. In FIG.

1, a single information processing apparatus D and a single home electrical appliance E are illustrated for convenience of explanation. However, each the information processing apparatus D and the home electrical appliance E are not limited to one in number. For example, the processing executed by the information processing apparatus D may be executed by a plurality of distributed apparatuses.

An outline of processing that is executed by a controller 1 of the information processing apparatus D according to the present embodiment will be described. The controller 1 identifies a user, acquires attribute information for the user stored in association with the user, and estimates, from the attribute information for the user, a power consumption amount for an environment preferred by the user. The controller 1 determines whether the estimated power consumption amount is equal to or greater than a standard value. Upon determining that the power consumption amount is equal to or greater than the standard value, the controller 1 guides the user to a first space, and upon determining that the power consumption amount is less than the standard value, guides the user to a second space. The power consumption amount for the first space S01 is greater than the power consumption amount for the second space S02. According to this configuration, the controller 1 can guide the user who prefers an environment with a greater power consumption amount, to the first space S01 with the greater power consumption amount, and guide the user who prefers an environment with a lower power consumption amount, to the second space S02 with a lower power consumption amount. Thus, the controller 1 can provide an environment that suits a preference for each user.

An internal configuration of the information processing apparatus D will be described in detail with reference to FIG. 1.

The information processing apparatus D includes a controller 1, a communication interface 2, a memory 3, an information acquisition interface 4, and an output interface 5. The components of the information processing apparatus D are communicably connected to one another via any network such as a dedicated line. The components of the information processing apparatus D may be physically distributed.

The controller 1 includes, for example, one or more general-purpose processors including a Central Processing Unit (CPU) or a Micro Processing Unit (MPU). The controller 1 may include one or more dedicated processors that are dedicated to specific processing. The controller 1 may include one or more dedicated circuits instead of the processor. Examples of dedicated circuits may include a Field-Programmable Gate Array (FPGA) and an Application Specific Integrated Circuit (ASIC).

The communication interface 2 includes, for connecting to the network NW, one or more communication modules that conform to wired or wireless Local Area Network (LAN) standards. The communication interface 2 may include one or more communication modules conforming to near field communication standards or specifications, including Bluetooth (Bluetooth is a registered trademark in Japan, other countries, or both), AirDrop (AirDrop is a registered trademark in Japan, other countries, or both), IrDA, ZigBee (ZigBee is a registered trademark in Japan, other countries, or both), Felica (Felica is a registered trademark in Japan, other countries, or both), or RFID. The communication interface 2 is configured to transmit and receive any appropriate information via the network NW. For example, the communication interface 2 acquires, from any home electrical appliance E, a usage history for the home electrical appliance E. The home electrical appliance E is, for example, an air conditioner, an electric fan, a carpet, a heating appliance, an air purifier, an humidifier, a dehumidifier or the like. The usage history includes a preset temperature, an air volume, a usage time, etc.

The memory 3 may be, but is not limited to, a semiconductor memory, a magnetic memory, or an optical memory. The memory 3 may function as, for example, a main memory, an auxiliary memory, or a cache memory. The memory 3 may store information resulting from analysis or processing performed by the controller 1. The memory 3 may also store various types of information regarding operations and control of the information processing apparatus D. The memory 3 may store a system program, an application program, embedded software, etc. The memory 3 includes a user DB, an attribute information DB, and a space DB. As an alternative example, the user DB, the attribute information DB, and the space DB may be stored in a storage device external to the information processing apparatus D and accessed from the information processing apparatus D.

The information acquisition interface 4 includes an imager. The imager includes a camera and can capture an image of its surroundings. Information acquisition interface 4 may transmit the captured image to the controller 1 for the purpose of analysis. The controller 1 can perform image analysis to identify a user in the captured image. As an alternative example, the information acquisition interface 4 may include a reader. The information acquisition interface 4 reads identification information for the user from a tag embedded in a card held by the user, from a mobile device held by the user, etc. As another alternative example, the information acquisition interface 4 acquires positional information for any terminal using, for example, a GPS (Global Positioning System). The information acquisition interface 4 can identify, from the acquired positional information, a terminal existing in the vicinity of the information processing apparatus D. As an alternative or additional example, the positional information may be acquired using at least one of QZSS, BeiDou, GLONASS, and Galileo. The term "QZSS" is an abbreviation of Quasi-Zenith Satellite System. QZSS satellites are called quasi-zenith satellites. The term "GLONASS" is an abbreviation of Global Navigation Satellite System.

The output interface 5 is a display interface and includes, for example, a panel display. The output interface 5 may display information read from the memory 3 or information generated by the controller 1. The output interface 5 may include a speaker configured to output, by voice audio, information generated by the controller 1, information read out from the memory 3, or the like.

Figure 2:
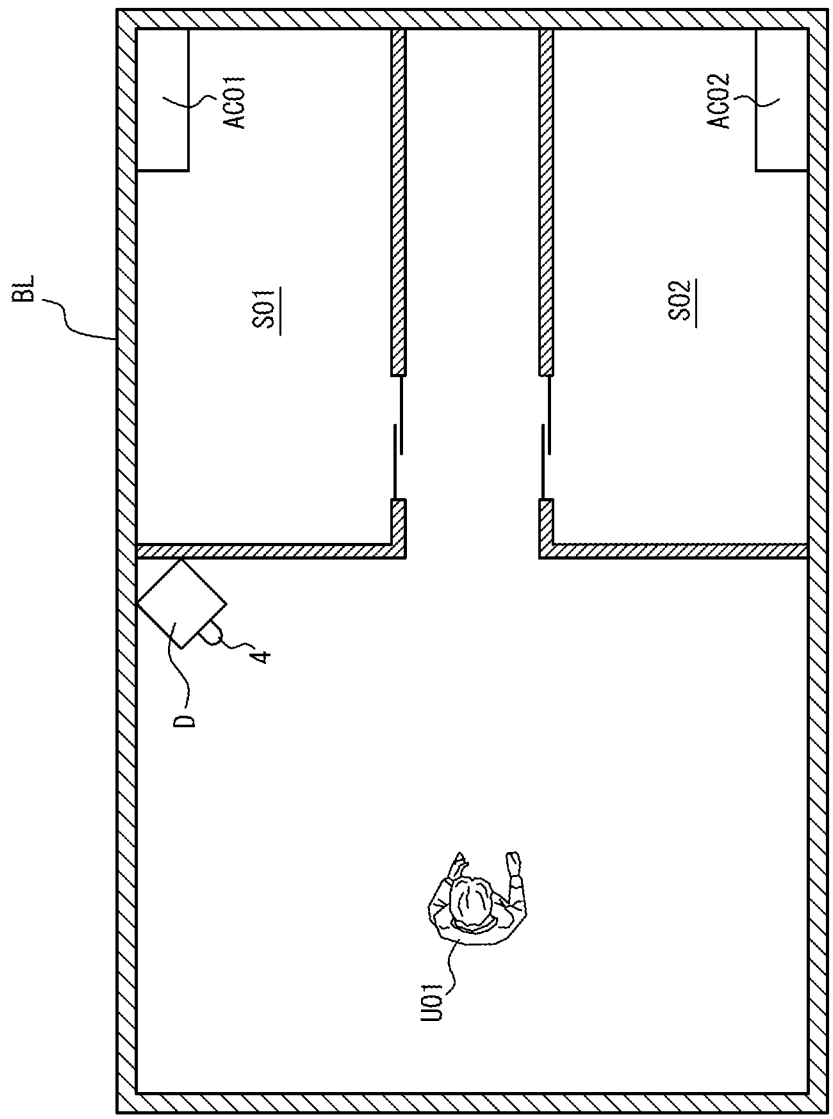
FIG. 2 is a placement diagram illustrating each element in a building.

Hereinafter, an information processing method executed by the information processing system S according to the present embodiment will be described in detail. Here, as an example, a situation as illustrated in FIG. 2 in which a user U01 in the building BL is in front of a first space S01 and a second space S02 and selects which space to enter will be described. The building BL includes the first space S01 and the second space S02. As an alternative example, the building BL may include more than two spaces. The first space S01 and the second space S02 here are rooms. As an alternative example, the first space S01 and the second space S02 may be passages or stairs. The first space S01 and the second space S02 may not be partitioned. As an additional or alternative example, each of the first space S01 and the second space S02 may be equipped with lighting. The information processing apparatus D illustrated in FIG. 2 is provided outside the first space S01 and the second space S02, but may be provided inside any of the first space S01 and the second space S02.

An air conditioner AC01 is installed in the first space S01. Here, as an example, the first space S01 is cooled by the air conditioner AC01 because the outside air temperature is relatively high. An air conditioner AC02 is installed in the second space S02. The second space S02 is cooled by the air conditioner AC02. The room temperature in the first space S01 is lower because the first space S01 is more strongly cooled than the second space S02.

As illustrated in FIG. 2, the information acquisition interface 4 of the information processing apparatus D captures the user U01. The information acquisition interface 4 transmits the captured image to the controller 1. The controller 1 analyzes the captured image to identify the user U01. For analyzing the image, any appropriate method for analyzing the image, such as machine learning, can be used.

The controller 1 refers to the user DB illustrated in FIG. 3 to identify attribute information stored in association with the user U01. The attribute information may be information pre-registered by each user. As an alternative example, the controller 1 acquires, from the home electrical appliance E (e.g., an air conditioner) used by the user U01, a usage history for the home electrical appliance E (e.g., a usage date and time, a preset temperature). The controller 1 may determine the attribute information for the user U01 from the usage history. For example, the controller 1 determines whether a difference between the outside air temperature at the usage date and time and the preset temperature at the usage date and time is equal to or greater than a predetermined value. When the difference is equal to or greater than the predetermined value, the controller 1 determines that the attribute information for the user U01 is "sensitive to heat". When the difference is less than the predetermined value, the controller 1 determines that the attribute information for the user U01 is "sensitive to cold". The controller 1 stores the determination result in the user DB.

The controller 1 identifies that the attribute information for the user U01 is "sensitive to heat". As illustrated in FIG. 3, any attribute information may be employed. For example, the attribute information can be "sensitive to cold", "prefers bright places", or "prefers dark places".

The controller 1 estimates, from the attribute information for the user, a power consumption amount for an environment preferred by the user. The controller 1 refers to the attribute information DB illustrated in FIG. 4. The attribute information DB stores the attribute information in association with the power consumption amount for the environment preferred by the user. The controller 1 identifies that the power consumption amount corresponding to the attribute information of "sensitive to heat" is 3 [kWh]. Information for the power consumption amount can be pre-registered. As an alternative example, the unit of power consumption amount may be [W] (watts) or [J] (joule).

The controller 1 refers to the space DB illustrated in FIG. 5. The space DB stores each space in the building BL in association with the power consumption amount currently consumed in each space. The information for the power consumption amount may be acquired from a monitoring server that monitors a power consumption amount for each of the first space S01 and the second space S02. The controller 1 identifies that the power consumption amount for the first space S01 is 3 [kWh]. The controller 1 identifies that the power consumption amount for the second space S02 is 1 [kWh]. The power consumption amount for the air conditioner AC01 in the first space S01 is greater than the power consumption amount for the air conditioner AC02 in the second space S02. Thus, a difference between the preset temperature for the air conditioner AC01 and the current outside air temperature is greater than a difference between the preset temperature for the air conditioner AC02 and the current outside air temperature.

In the example in which lighting is installed in each of the first space S01 and second space S02, the power consumption amount for the first space S01 is greater than the power consumption amount for the second space S02. Thus, illuminance ([Lux], [cd] or [Lm]) of lighting in the first space S01 is greater than illuminance of lighting in the second space S02.

The controller 1 reads a standard value for the power consumption amount from the memory 3. The standard value can be set appropriately. For convenience of explanation, the standard value is 1.5 [kWh]. The controller 1 compares the read standard value with the above-estimated power consumption amount for the environment preferred by the user.

In the present embodiment, as described above, it is determined that the user U01 is sensitive to heat. The power consumption amount for the environment preferred by the user U01 is 3 [kWh]. The controller 1 compares the power consumption amount preferred by the user U01 (here, 3 [kWh]) with the above-read standard value for the power consumption amount (here, 1.5 [kWh]). The controller 1 determines that the power consumption amount for the environment preferred by the user U01 is equal to or greater than the standard value for the power consumption amount.

Figure 6:
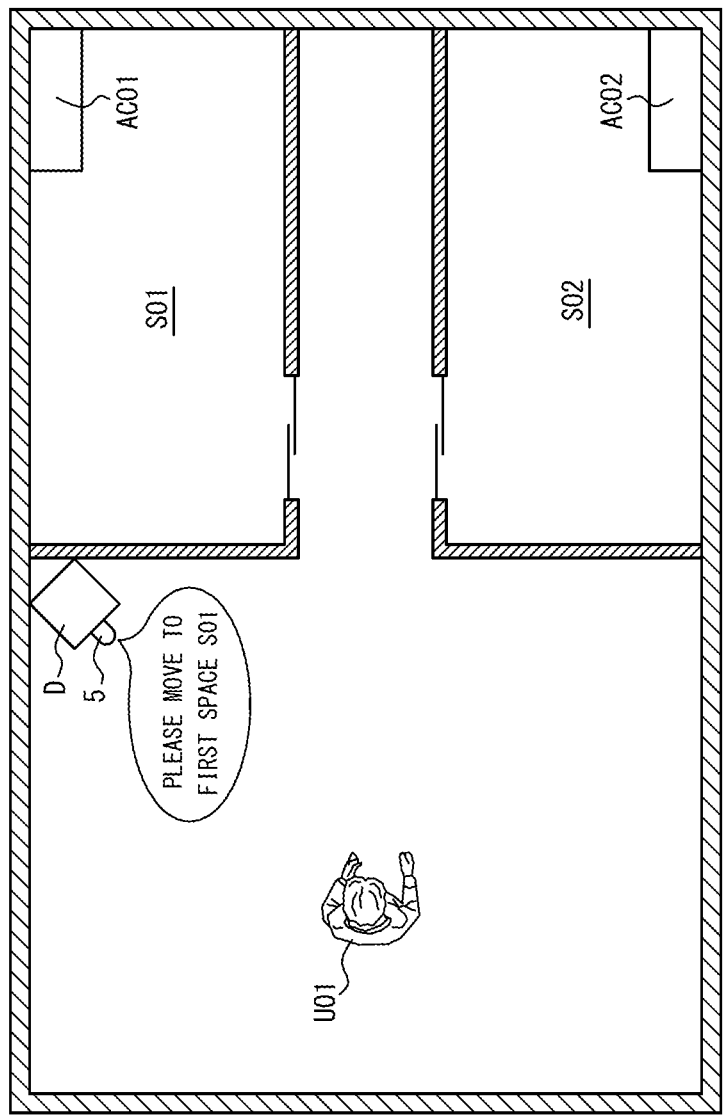
FIG. 6 is a diagram illustrating guidance provided by the information processing apparatus.

The controller 1 guides the user U01 to the first space S01. Specifically, as illustrated in FIG. 6, the controller 1 outputs, from the output interface 5, a sound prompting the user U01 to move to the first space S01. As an alternative example, the controller 1 may display, on the output interface 5, a screen prompting the user U01 to move to the first space S01. As another alternative example, the controller 1 may transmit, to a mobile device held by the user U01, a notification prompting the user U01 to move to the first space S01.

As an alternative example, a user U02 is sensitive to cold as illustrated in FIG. 3. As illustrated in FIG. 4, a power consumption amount for an environment preferred by the user U02 is 0.5 [kWh]. The controller 1 determines that the power consumption amount for the environment preferred by the user U02 is less than the standard value. The controller 1 guides the user U02 to the second space S02.

The information processing method performed by the controller 1 of the information processing apparatus D will be described with reference to FIG. 7.

In Step S1, the controller 1 identifies a user using the information acquisition interface 4.

In Step S2, the controller 1 acquires, from the memory 3, the attribute information for the identified user.

In Step S3, the controller 1 estimates, from the attribute information, the power consumption amount for the environment preferred by the user.

In Step S4, the controller 1 determines whether the estimated power consumption amount is equal to or greater than the standard value.

If the result of the determination is "Yes" in Step S4, the controller 1 guides the user to the first space S01 in Step S5. The power consumption amount for the first space S01 is greater than the power consumption amount for the second space S02.

If the result of the determination is "No" in Step S5, the controller 1 guides user to the second space S02 in Step S6.

As has been described, according to the present embodiment, the controller 1 identifies the user, acquires the attribute information for the user stored in association with the user, and estimates, from the attribute information for the user, the power consumption amount for the environment preferred by the user. The controller 1 determines whether the power consumption amount is equal to or greater than the standard value. The controller 1, upon determining that the power consumption amount is equal to or greater than the standard value, guides the user to the first space S01, and upon determining that the power consumption amount is less than the standard value, guides the user to the second space S02. The power consumption amount for the first space S01 is greater than the power consumption amount for the second space S02. According to this configuration, the controller 1 can guide a user who prefers an environment with greater power consumption amount to the first space S01 with the greater power consumption amount, and guide a user who prefers an environment with lower power consumption amount to the second space S02 with lower power consumption amount. Thus, the controller 1 can provide an environment that suits the preferences for each user.

Moreover, according to the present embodiment, each of the first space S01 and the second space S02 includes a room, a passage, or stairs. An air conditioner is installed in each of the first space S01 and the second space S02. In the first space S01, a difference between the preset temperature and the current outside air temperature is greater than in the second space S02. Lighting is installed in each of the first space S01 and second space S02. In the first space S01, the illuminance of the lighting is greater than in the second space S02. According to this configuration, the controller 1 can provide an environment that suits a preference for each user in various locations or situations.

Moreover, according to the present embodiment, the controller 1 further executes acquiring the usage history for the home electrical appliance E and determining from the usage history the attribute information for the user. The home electrical appliance E includes an air conditioner, and the usage history includes a preset temperature for the air conditioner. According to this configuration, the controller 1 can more accurately determine the attribute information from a daily life pattern for the user.

Moreover, according to the present embodiment, guiding the user to the first space S01 or the second space S02 includes at least one of outputting, form the output interface 5, a sound prompting the user to move to the first space S01 or the second space S02, displaying on the output interface a screen prompting the user to move to the first space S01 or the second space S02, and transmitting a notification prompting the user to move to the first space S01 or the second space S02 to a mobile device held by the user. According to this configuration, the controller 1 can reliably and smoothly guide the user.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each step can be rearranged without logical inconsistency, and a plurality of steps can be combined into one or divided.

For example, in the above embodiment, a program that executes all or some of the functions or processing of the information processing apparatus D can be recorded on a computer readable recording medium. The computer readable recording medium includes a non-transitory computer readable medium and may be a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may also be provided as a program product. The present disclosure can also be implemented as a program executable by a processor.

The invention claimed is:

1. An information processing apparatus comprising a controller, wherein the controller is configured to execute operations, the operations comprising:
  identifying a user;
  acquiring attribute information for the user, the attribute information being stored in association with the user;
  estimating, from the attribute information, a power consumption amount for an environment preferred by the user;
  determining whether the power consumption amount is equal to or greater than a predetermined value;
  upon determining that the power consumption amount is equal to or greater than the predetermined value, guiding the user to a first space; and
  upon determining that the power consumption amount is less than the predetermined value, guiding the user to a second space,
  wherein:
  a power consumption amount for the first space is greater than a power consumption amount for the second space;
  the information processing apparatus is configured to communicably connect to a home electrical appliance used by the user, and the operations further comprise:
    acquiring a usage history for the home electrical appliance; and
    determining, from the usage history, the attribute information for the user;
  the home electrical appliance comprises a home air conditioner; and
  the usage history comprises a preset temperature for the home air conditioner.

2. The information processing apparatus according to claim 1, wherein each of the first space and the second space comprises a room, a passage, or stairs.

3. The information processing apparatus according to claim 1,
  wherein an air conditioner is installed in each of the first space and the second space, and
  wherein a difference between a preset temperature for the air conditioner installed in the first space and a current outside air temperature is greater than a difference between a preset temperature for the air conditioner installed in the second space and the current outside air temperature.

4. The information processing apparatus according to claim 1,
  wherein lighting is installed in each of the first space and the second space; and
  wherein, in the first space, illuminance of the lighting is greater than in the second space.

5. The information processing apparatus according to claim 1, further comprising an output interface, wherein guiding the user to the first space or the second space comprises at least one of:
outputting, from the output interface, a sound prompting the user to move to the first space or the second space; and
displaying, on the output interface, a screen prompting the user to move to the first space or the second space.

6. A non-transitory computer readable medium storing a program configured to cause a computer, as an information processing apparatus, to execute operations, the operations comprising:
identifying a user;
acquiring attribute information for the user, the attribute information being stored in association with the user;
estimating, from the attribute information, a power consumption amount for an environment preferred by the user;
determining whether the power consumption amount is equal to or greater than a predetermined value;
upon determining that the power consumption amount is equal to or greater than the predetermined value, guiding the user to a first space;
upon determining that the power consumption amount is less than the predetermined value, guiding the user to a second space; and
communicably connecting to a home electrical appliance used by the user, the home electrical appliance comprising a home air conditioner;
acquiring a usage history for the home electrical appliance, the usage history comprising a preset temperature for the home air conditioner; and
determining, from the usage history, attribute information for the user,
wherein a power consumption amount for the first space is greater than a power consumption amount for the second space.

7. The non-transitory computer readable medium according to claim 6, wherein each of the first space and the second space comprises a room, a passage, or stairs.

8. The non-transitory computer readable medium according to claim 6,
wherein an air conditioner is installed in each of the first space and the second space, and
wherein a difference between a preset temperature for the air conditioner installed in the first space and a current outside air temperature is greater than a difference between a preset temperature for the air conditioner installed in the second space and the current outside air temperature.

9. The non-transitory computer readable medium according to claim 6,
wherein lighting is installed in each of the first space and the second space; and
wherein, in the first space, illuminance of the lighting is greater than in the second space.

10. The non-transitory computer readable medium according to claim 6,
wherein the information processing apparatus further comprises an output interface, and
wherein guiding the user to the first space or the second space comprises at least one of:
outputting, from the output interface, a sound prompting the user to move to the first space or the second space; and
displaying, on the output interface, a screen prompting the user to move to the first space or the second space.

11. An information processing method performed by an information processing apparatus, the information processing method comprising:
identifying a user;
acquiring attribute information for the user, the attribute information being stored in association with the user;
estimating, from the attribute information, a power consumption amount for an environment preferred by the user;
determining whether the power consumption amount is equal to or greater than a predetermined value;
upon determining that the power consumption amount is equal to or greater than the predetermined value, guiding the user to a first space;
upon determining that the power consumption amount is less than the predetermined value, guiding the user to a second space;
communicably connecting to a home electrical appliance used by the user, the home electrical appliance comprising a home air conditioner;
acquiring a usage history for the home electrical appliance, the usage history comprising a preset temperature for the home air conditioner; and
determining, from the usage history, attribute information for the user,
wherein a power consumption amount for the first space is greater than a power consumption amount for the second space.

12. The information processing method according to claim 11, wherein each of the first space and the second space comprises a room, a passage, or stairs.

13. The information processing method according to claim 11,
wherein an air conditioner is installed in each of the first space and the second space, and
wherein a difference between a preset temperature for the air conditioner installed in the first space and a current outside air temperature is greater than a difference between a preset temperature for the air conditioner installed in the second space and the current outside air temperature.

14. The information processing method according to claim 11,
wherein lighting is installed in each of the first space and the second space; and
wherein, in the first space, illuminance of the lighting is greater than in the second space.

* * * * *